United States Patent
Crowder (10) Patent No.: US 12,159,026 B2
(45) Date of Patent: Dec. 3, 2024

(54) AUDIO ASSOCIATIONS FOR INTERACTIVE MEDIA EVENT TRIGGERING

(71) Applicant: Microsoft Technology Licensing, LLC, Redmond, WA (US)

(72) Inventor: James Aaron Crowder, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 130 days.

(21) Appl. No.: 16/903,101

(22) Filed: Jun. 16, 2020

(65) Prior Publication Data

US 2021/0389868 A1    Dec. 16, 2021

(51) Int. Cl.
*G06F 3/04847* (2022.01)
*A63F 13/285* (2014.01)
(Continued)

(52) U.S. Cl.
CPC ........ *G06F 3/04847* (2013.01); *A63F 13/285* (2014.09); *A63F 13/63* (2014.09);
(Continued)

(58) Field of Classification Search
CPC ...... G06F 3/04847; G06F 3/016; G06F 3/165; G10L 15/26; A63F 13/63; A63F 13/285; A63F 2300/6018; A63F 2300/302
See application file for complete search history.

(56) References Cited

U.S. PATENT DOCUMENTS 4,884,972 A * 12/1989 Gasper ............... G09B 5/065
                                                                434/167
5,428,707 A *  6/1995 Gould ................. G10L 15/22
                                                                704/231
(Continued)

FOREIGN PATENT DOCUMENTS

EP         2846226 A2    3/2015
WO      2020096868 A1    5/2020

OTHER PUBLICATIONS

Casares et al. "Simplifying video editing using metadata." 2002. In Proceedings of the 4th conference on Designing interactive systems: processes, practices, methods, and techniques (DIS '02). Association for Computing Machinery, New York, NY, USA, 157-166. DOI:https://doi.org/10.1145/778712.778737 (Year: 2002).*

(Continued)

*Primary Examiner* — Matthew Ell
*Assistant Examiner* — Alvaro R Calderon, IV
(74) *Attorney, Agent, or Firm* — Holzer Patel Drennan (57) ABSTRACT

A system includes a development tool for adding electronically-driven effects to a dynamic user-influenced media experience. The development tool is adapted to receive first user input and second user input. The first user input defines an audio trigger corresponding to one or more words or phrases appearing in a textual transcript of an audio content stream that includes audio data to be played as part of the dynamic user-influenced media experience. The second user input defines an event that is to be executed in temporal (Continued)

association with an audible occurrence of the audio trigger. The development tool generates metadata based on the first user input and the second user input, and an application engine interprets the metadata as an instruction to selectively trigger execution of the event in association with the audible occurrence of the audio trigger while presenting the dynamic user-influenced media experience.

20 Claims, 5 Drawing Sheets

(51) Int. Cl.
 A63F 13/63 (2014.01)
 G06F 3/01 (2006.01)
 G06F 3/16 (2006.01)
 G10L 15/26 (2006.01)

(52) U.S. Cl.
 CPC .............. *G06F 3/016* (2013.01); *G06F 3/165* (2013.01); *G10L 15/26* (2013.01); *A63F 2300/302* (2013.01); *A63F 2300/6018* (2013.01)

(56) References Cited

U.S. PATENT DOCUMENTS

| | | | | |
|---|---|---|---|---|
| 5,983,190 | A * | 11/1999 | Trower, II | G06F 3/0481 704/275 |
| 6,169,540 | B1 * | 1/2001 | Rosenberg | G06F 3/0383 345/157 |
| 6,181,351 | B1 * | 1/2001 | Merrill | G10L 21/06 345/473 |
| 6,260,011 | B1 * | 7/2001 | Heckerman | G09B 5/062 704/235 |
| 6,356,867 | B1 * | 3/2002 | Gabai | G06F 9/453 704/270 |
| 8,645,134 | B1 * | 2/2014 | Harrenstien | G10L 15/26 704/235 |
| 8,858,312 | B1 * | 10/2014 | Ward | A63F 13/20 463/7 |
| 8,938,394 | B1 * | 1/2015 | Faaborg | G06F 3/167 704/275 |
| 9,484,032 | B2 | 11/2016 | Yadav et al. | |
| 9,609,397 | B1 | 3/2017 | Barreira Avegliano et al. | |
| 10,127,908 | B1 * | 11/2018 | Deller | G10L 13/047 |
| 10,490,183 | B2 | 11/2019 | Singh et al. | |
| 2002/0010916 | A1 * | 1/2002 | Thong | H04N 5/278 725/1 |
| 2002/0031262 | A1 * | 3/2002 | Imagawa | H04N 21/4223 382/190 |
| 2004/0001106 | A1 * | 1/2004 | Deutscher | G06F 16/40 715/838 |
| 2004/0160415 | A1 * | 8/2004 | Rosenberg | G06F 3/0383 345/156 |
| 2005/0004800 | A1 * | 1/2005 | Wang | H04M 3/493 704/270.1 |
| 2005/0042591 | A1 * | 2/2005 | Bloom | G11B 27/34 434/308 |
| 2007/0011012 | A1 * | 1/2007 | Yurick | G10L 15/26 704/277 |
| 2007/0106509 | A1 * | 5/2007 | Acero | G06F 16/68 704/240 |
| 2007/0255565 | A1 * | 11/2007 | Yu | G06F 16/7844 704/251 |
| 2008/0004117 | A1 * | 1/2008 | Stamper | A63F 13/30 463/42 |
| 2008/0104527 | A1 * | 5/2008 | Jaeger | G06F 3/0481 715/763 |
| 2008/0195370 | A1 * | 8/2008 | Neubacher | G10L 13/00 704/E21.02 |
| 2009/0199235 | A1 * | 8/2009 | Surendran | G06Q 30/02 725/34 |
| 2010/0241963 | A1 * | 9/2010 | Kulis | G06F 16/685 715/727 |
| 2011/0016425 | A1 * | 1/2011 | Homburg | G06F 3/0482 715/811 |
| 2011/0066941 | A1 * | 3/2011 | Chipchase | G06F 3/165 715/716 |
| 2011/0288863 | A1 * | 11/2011 | Rasmussen | G10L 15/04 704/235 |
| 2011/0301943 | A1 * | 12/2011 | Patch | G10L 15/26 704/9 |
| 2012/0033948 | A1 * | 2/2012 | Rodriguez | H04N 9/802 386/282 |
| 2012/0236201 | A1 | 9/2012 | Larsen et al. | |
| 2012/0245721 | A1 * | 9/2012 | Story, Jr. | G06F 3/04842 700/94 |
| 2012/0315881 | A1 * | 12/2012 | Woloshyn | G06F 3/0488 455/412.2 |
| 2012/0323897 | A1 * | 12/2012 | Daher | G06F 16/433 707/723 |
| 2013/0083036 | A1 * | 4/2013 | Cario | A63F 13/60 345/473 |
| 2013/0132079 | A1 * | 5/2013 | Sehgal | G10L 15/22 704/235 |
| 2013/0298033 | A1 * | 11/2013 | Momchilov | G06F 3/0481 715/740 |
| 2013/0334300 | A1 * | 12/2013 | Evans | G06F 16/44 235/375 |
| 2014/0082501 | A1 * | 3/2014 | Bae | G06F 3/167 715/728 |
| 2014/0237392 | A1 * | 8/2014 | Hoomani | A63F 13/12 715/757 |
| 2015/0026577 | A1 * | 1/2015 | Story | G06F 3/04847 715/720 |
| 2015/0271442 | A1 * | 9/2015 | Cronin | H04N 21/4394 348/464 |
| 2015/0356836 | A1 * | 12/2015 | Schlesinger | G08B 3/10 704/235 |
| 2017/0083620 | A1 * | 3/2017 | Chew | G06F 16/48 |
| 2017/0085854 | A1 * | 3/2017 | Furesjö | G06F 3/0485 |
| 2017/0352352 | A1 * | 12/2017 | Wang | G10L 15/30 |
| 2018/0053510 | A1 * | 2/2018 | Kofman | G06F 16/685 |
| 2018/0345133 | A1 * | 12/2018 | Gassoway | G06F 3/016 |
| 2018/0358052 | A1 * | 12/2018 | Miller | G11B 27/036 |
| 2018/0366013 | A1 * | 12/2018 | Arvindam | G06F 40/205 |
| 2019/0043492 | A1 * | 2/2019 | Lang | H04N 21/42203 |
| 2019/0189026 | A1 * | 6/2019 | Daniels | G10L 15/08 |
| 2020/0051302 | A1 | 2/2020 | Subramonyam et al. | |
| 2020/0126559 | A1 | 4/2020 | Ochshorn et al. | |
| 2020/0159838 | A1 * | 5/2020 | Kikin-Gil | G06F 16/4393 |
| 2020/0174755 | A1 * | 6/2020 | Rose | G06F 8/34 |
| 2020/0174757 | A1 * | 6/2020 | Rose | G06F 8/34 |
| 2021/0165973 | A1 * | 6/2021 | Kofman | G10L 15/22 |

OTHER PUBLICATIONS

"Amazon Transcribe", Retrieved from: https://web.archive.org/web/20200419175909/https://aws.amazon.com/transcribe/, Apr. 19, 2020, 5 Pages.

"Speech-to-Text API", Retrieved from: https://www.amberscript.com/en/speech-to-text-api, Retrieved Date: May 5, 2020, 13 Pages.

"Speech-to-Text basics", Retrieved from: https://cloud.google.com/speech-to-text/docs/basics, Retrieved Date: May 5, 2020, 15 Pages.

Dachowski, Rob, "Create Video Subtitles with Translation using Machine Learning", Retrieved from: https://aws.amazon.com/blogs/machine-learning/create-video-subtitles-with-translation-using-machine-learning/, Aug. 10, 2018, 21 Pages.

Xiong, et al., "The Microsoft 2017 Conversational Speech Recognition System", In Technical Report MSR-TR-2017-39, Aug. 2017, 9 Pages.

"International Search Report and Written Opinion Issued in PCT Application No. PCT/US2021/029041", Mailed Date: Jul. 22, 2021, 11 Pages.

(56) References Cited

OTHER PUBLICATIONS

Communication pursuant to Article 94(3) EPC Received for European Application No. 21725911.8, mailed on Oct. 10, 2024, 10 pages.

* cited by examiner

AUDIO ASSOCIATIONS FOR INTERACTIVE MEDIA EVENT TRIGGERING

BACKGROUND

Interactive media experiences, such as those provided by simulations and video games, may be generated by large teams of audio, visual, and effects specialists that generate complex subcomponents that are melded together through a nuanced, lengthy process to create sophisticated, realistic animations.

In many cases, it is desirable for certain effects (e.g., sub-animations, vibrational feedback to a controller) to be synchronized with aspects of an audio content stream. For this reason, animation and special effects developers often wait until after an audio content stream is synced with an animation to add in certain effects. Accurate synchronization of such events with target locations within an audio content stream may be achieved via an onerous process that entails watching each animation, noting the frame number(s) and/or timestamp where a certain target word is spoken by a character, and then generating effects that are tied to those particular timestamps. This is tedious and time consuming.

SUMMARY

According to one implementation, a system disclosed herein includes a development tool for adding electronically-driven effects to a dynamic user-influenced media experience generated by an application engine. The development tool receives first user input defining an audio trigger corresponding to one or more words or phrases appearing in a textual transcript of an audio content stream. The development tool also receives second user input defining an event that is to be executed in temporal association with an audible occurrence of the audio trigger. The development tool generates metadata based on the first user input and the second user input, and the application engine interprets the metadata as an instruction to selectively trigger execution of the event in association with the audible occurrence of the audio trigger while presenting the dynamic user-influenced media experience.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology provides a media development tool that facilitates the creation and insertion of audio-synchronized events within a dynamic user-influenced media experience. As used herein, the term "dynamic user-influenced media experience" refers to an audio/visual experience that is adapted to change (e.g., vary in visual/audio content or other sensory effects) based on user inputs received while a media content stream is being presented to a user. For example, a dynamic user-influenced media experience may be a video game for which user inputs drive the timing or sequence of animated events.

Some dynamic user-influenced media experiences are simulations rather than games. For example, pilots, military personnel, and emergency responders may all utilize virtual training simulations adapted to present different media content based on the decisions. Dynamic user-included media experiences may also be provided by 'smart' fitness equipment equipped with virtual instruction to vary aspects of the user experience (e.g., provide certain encouragement, increase/decrease resistance or incline) based on inputs from the equipment monitoring user activity (e.g., cadence, cycling power) or from biometric sensors worn by a user (heart rate). In still other implementations, dynamic user-influenced media experiences provide story-telling entertainment, such via a "make-your-own story" video format in which a user dynamically builds the plot by selecting character actions or decisions along the way.

When creating any of the above-described types of dynamic user-influenced media experiences, design developers may desire to selectively time or synchronize certain events referred to herein as "audio-triggered events" with aspects of an audio track. By example and without limitation, the term "audio-triggered events" is used herein to refer to aspects of a dynamic user-influenced media experience that are to be triggered in synchronicity with or otherwise triggered based on target locations within an audio track. Audio-triggered events may, for example, be visual or audio effects (e.g., sub-animations or sound bites) that are timed to correspond precisely with locations (e.g., spoken words) within a base audio track, such as a voice track. Alternatively, "audio-triggered events" may refer to effects that are not visually or audibly sensed by a user. For example, an event named "save game" may be automatically triggered to save a game state in synchronicity with a game character speaking: "you're safe—now rest." In still other scenarios, "audio-triggered events" may provide a user with sensory feedback that tactile rather than audible or visual. For example, a hand-held gaming controller may provide vibrational haptic feedback when a user's avatar is wounded, such as in synchronicity with a panicked scream on the audio track. Alternatively, a fitness simulator may alter tactile feedback by lowering pedal resistance of a stationary bike when the simulator's audio track says: "You've got this! Five more seconds. You're done in five . . . four . . . three . . . two . . . one."

Existing solutions for encoding audio-based effects may require developers to watch hours of animation reels to manually note target frames containing the dialogue that they wish to sync with particular effects. The herein disclosed technology provides a development tool that simplifies the creation of associations between locations within an audio content stream and select events ("audio-triggered events") that are to be executed by an application engine while the application engine is actively rendering aspects of a dynamic user-influenced media experience. In one implementation, the development tool embeds these associations in metadata processed at runtime by an application engine while the application engine is actively generating scene animations and playing the associated audio content stream. Based on the associations embedded in this metadata, the application engine automatically initiates execution of the specified select events at the associated audio track locations such that the events may be executed in temporal correlation with certain words or phrases ("audio triggers"), noises, sounds, etc. within the audio track.

Figure 1:
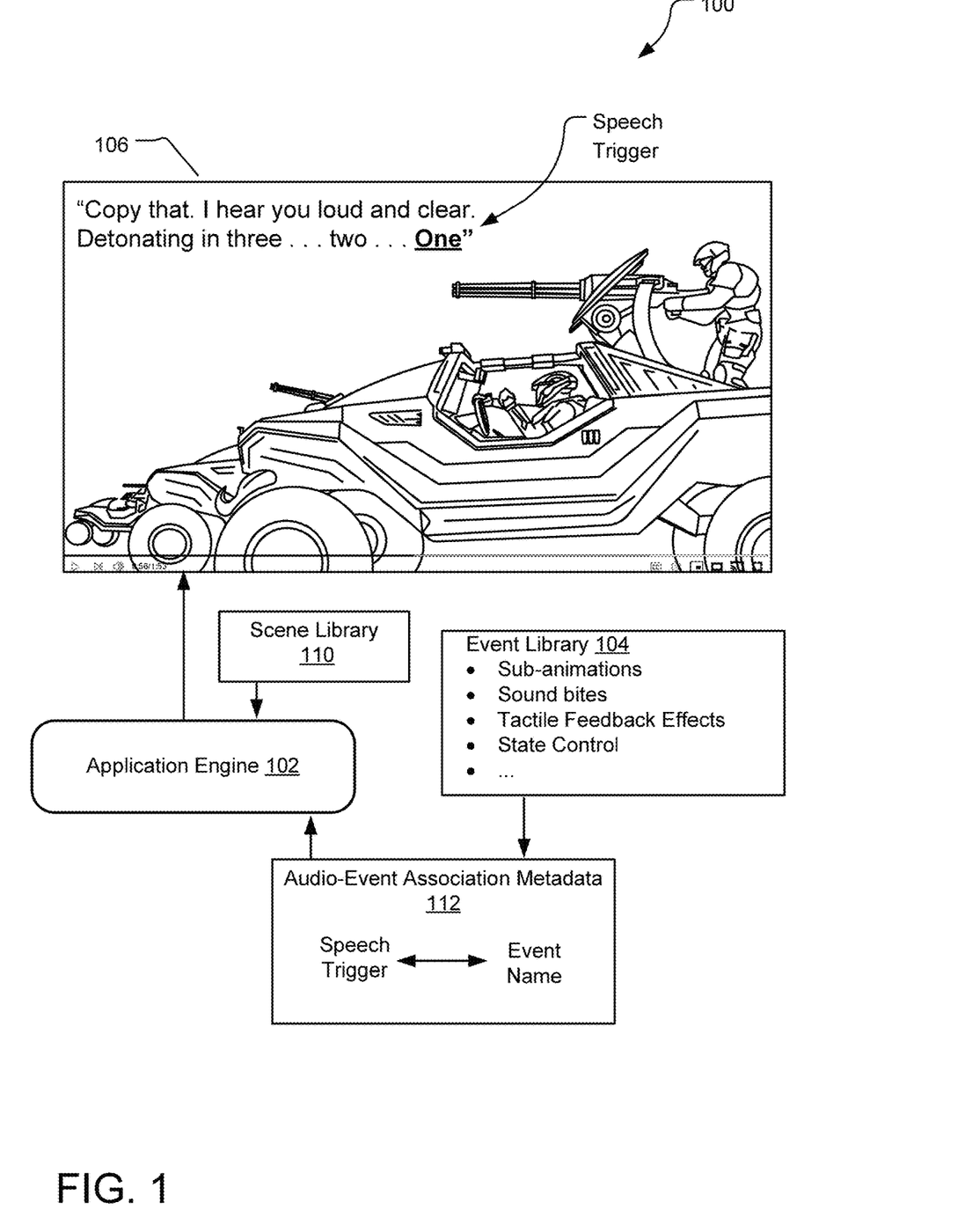
FIG. 1 illustrates an example system that utilizes audio-based event associations to drive timing of certain select events executed as part of a dynamic user-influenced media experience.

FIG. 1 illustrates an example system 100 that utilizes audio-based event associations to drive timing of certain select events executed as part of a dynamic user-influenced media experience. The dynamic user-influenced media experience provides a user with both audio and visual content and may, in some implementations, also provide the user with other types of sensory effects such as tactile feedback. The dynamic user-influenced media experience is generated and driven by an application engine 102. The application engine 102 may be understood as including a combination of software and hardware adapted to drive execution of subroutines that collectively provide for presentation of all aspects of the dynamic user-influenced media experience. For example, the application engine may be a game or application file. In Microsoft's Xbox® platform, the application engine 102 is, for example, a .xex file.

During presentation of the dynamic user-influenced media experience, the application engine 102 reads and processes data stored in a scene library 110 to generate different scenes. In general, generating a particular scene entails reading and processing packaged data that may include both visual and audio components. Visual data of each scene is rendered to a display 106 while the audio data of each scene is streamed through speakers (not shown) of a user device. The scenes are not necessarily static but rather dynamic with components that may vary based on user input. For example, the user may be able to provide controller, voice, or other input to dynamically guide what is shown in a particular scene as well as to select particular actions that character(s) of the scene may take.

Presenting each scene may, for example, entail one or more of: playing a sequence of stored visual and audio components, procedurally-generating visual components such as particle effects, lighting changes, and camera angles according to predefined timing, and continuously selecting, ordering, and/or dynamically updating such visual and audio components based on user input, unscripted artificial intelligence (AI) behavior, or other dynamic game state data. Executing a scene stored in the scene library 110 may entail executing certain events (subroutines, functions, etc.) defined in an event library 104. For example, the event library 104 includes events defined by a developer as part of an application or development framework for the application engine 102. Exemplary categories of events that may be defined in the event library 104 include, without limitation, sub-animations, sound bites, tactile feedback events (e.g., haptic feedback to vibrate a handheld controller), events to update the state of an in-game object such as killing a character unit, altering an AI state, updating player objectives, and other events that provide state control such as saving a game, returning to prior checkpoint in a game, restoring or updating certain game or player settings).

During development of the dynamic user-influenced media experience (e.g., game or simulation), a developer may desire to synchronize certain events from the event library 104 with aspects of an audio content stream (e.g., one or more audio tracks) of a particular scene. In the presently-disclosed system, this audio/event synchronization is achieved by providing the application engine 102 with a metadata component, referred to herein as "audio-event association metadata 112" that defines associations between the names of events defined in the event library 104 and specific locations within an audio content stream for a particular scene. For example, each individual scene may include one or more audio tracks (e.g., a different audio track for each character's lines, tracks that include background music, sounds, etc.). In one implementation, the audio-event association metadata 112 includes a list of events from the event library 104 that are each mapped to a select timestamp corresponding to a "audio trigger" of a select corresponding audio track for the scene.

For example, in the game scenario illustrated in FIG. 1, the application engine 102 presents a war-time visual animation. While presenting the illustrated scene, the application engine 102 plays an audio content stream for the scene while simultaneously reading and processing audio-event association metadata 112. As used herein, an "audio content stream" may consist of multiple different audio tracks played concurrently or sequentially within a scene. For example, the audio content stream may include one audio track with background sound effects and different audio tracks that each respectively include the spoken lines for each different character in a scene. In FIG. 1, the exemplary audio content stream includes a sound clip with human voice saying: "Copy that. I hear you loud and clear. Detonating in three . . . two . . . one." In this example, the audio-event association metadata defines an event associated with the timestamp at which the word "one" is spoken. Upon reaching this timestamp relative to the start of the audio content stream, the application engine 102 selectively triggers execution of the defined event. For example, the event may launch a particular sub-animation such as an explosion or provide vibrational feedback provided to the user through a hand-held controller.

Notably, an audio-triggered events defined within the audio-event association metadata 112 are not necessarily static and may include content that varies depending on user inputs. For example, a game audio content stream may have a character that says "Phew! We made it" when the character reaches a geographical checkpoint that serves as a temporal "end" to the level. A developer may choose to use this voice line ("we made it") as a trigger to initiate an "end-level" animation, and this animation may itself include Boolean logic that alters the nature of the animation depending on whether or not the user has completed a set list of objectives. Likewise, and an audio-triggered event may itself trigger one or more additional events that also may vary depending on user inputs. For example, a sub-animation event named "explosion" may conditionally trigger an end-of-battle victory sound bite event if user successfully performed a set collection of tasks prior to the explosion.

In the above-described manner, the audio-event association metadata 112 provides for the execution of defined events in precise synchronicity with target locations in an audio file without a need for a developer to encode such events directly within the scene or identify the particular timestamps for such events. This timestamp identification is instead determined by an event-timing development tool, such as that discussed below with respect to FIG. 2.

Figure 2:
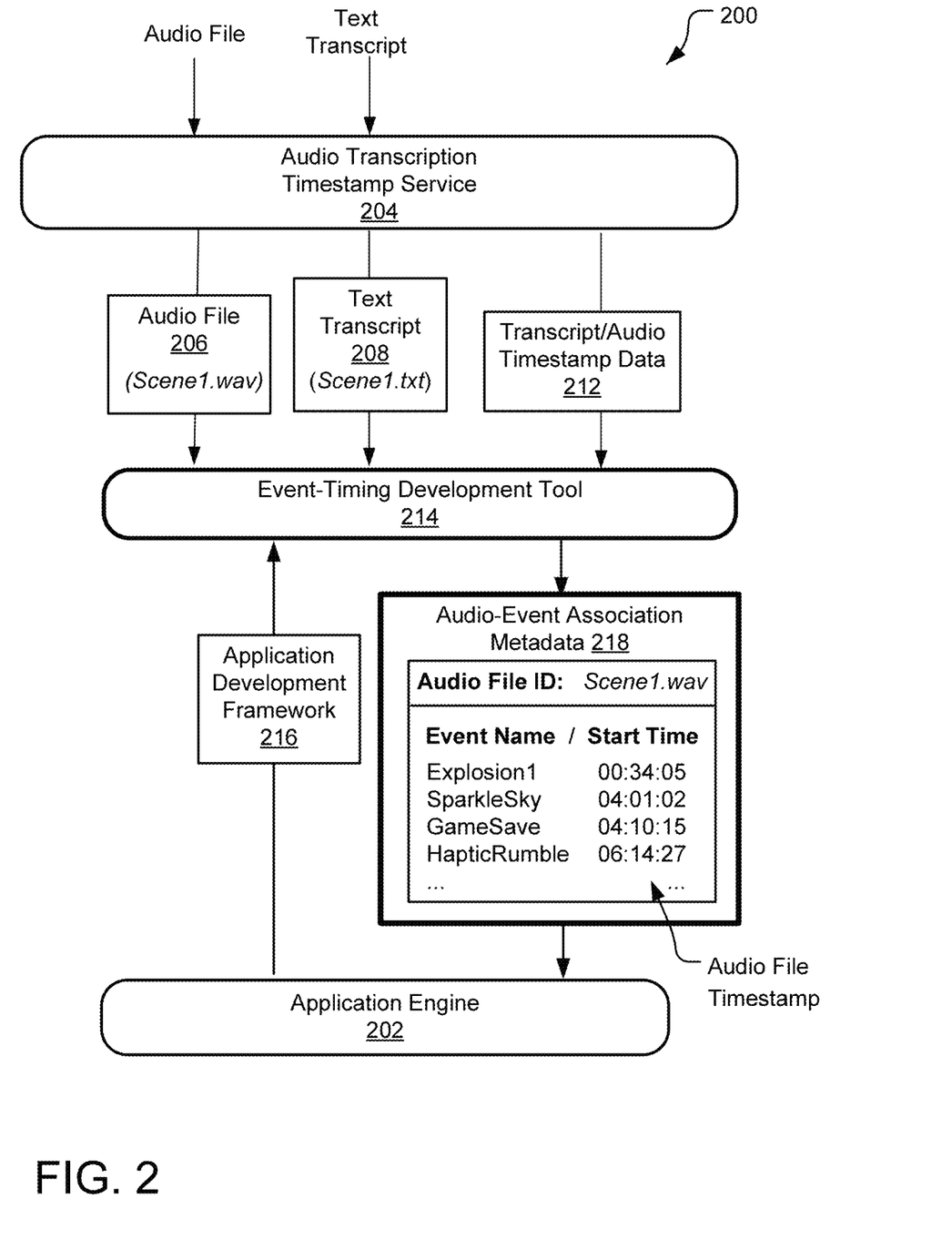
FIG. 2 illustrates an example system that uses an event-timing development tool to create audio-based event associations used to drive timing of certain select events executed as part of a dynamic user-influenced media experience.

FIG. 2 illustrates an example system 200 that uses an event-timing development tool 214 to create audio-based event associations usable by an application engine 202 to drive timing of certain select events executed as part of a dynamic user-influenced media experience. The system 200 includes an audio transcription timestamp service 204 that analyzes an audio file 206 in view of a textual transcript 208 of the audio file 206 to determine timestamp locations within the audio file 206 where individual words in the textual transcript 208 are spoken. This timestamp data is referred to below and shown in FIG. 2 as transcript/audio timestamp data 212. For example, the transcript/audio timestamp data 212 may include a timestamp for each word in the textual transcript 208. The timestamp identifies a location where the word is spoken within the audio file 206.

In one implementation, the audio transcription timestamp service 204 accepts the audio file 206 and the textual transcript 208 as inputs and outputs this same information in addition to the transcript/audio timestamp data 212. In another implementation, the audio transcription timestamp service 204 receives the audio file 206 as input and self-generates the textual transcript 208 in addition to the transcript/audio timestamp data 212. For example, the audio transcription timestamp service 204 may generate the textual transcript 208 using a speech-recognition model trained with artificial intelligence (AI). In some implementations, the audio transcription timestamp service 204 is a web-based service managed by a third-party different than the party managing the event-timing development tool 214. In other implementations, the audio transcription timestamp service 204 is an integrated function provided by the event-timing development tool 214.

The audio file 206, textual transcript 208, and transcript/audio timestamp data 212 are all provided as inputs to the event-timing development tool 214, which is used by a developer to add audio-triggered events to a scene that is presented as part of a dynamic user-influenced media experience. In addition to these inputs, the event-timing development tool 214 is also populated with an application development framework 216 that is used by the application engine 202 to execute each scene. The application development framework 216 includes, for example, a schema defining executable events available to the application engine 202 as well as the various input and output parameters for each such event. For example, the application development framework 216 may be built with current code libraries from the application engine 202 and may, in some implementations, include sufficient data to facilitate reading, writing, and exporting data modules built from events, objects, and API defined in the codebase of the application engine 202.

While using the event-timing development tool 214, a user may be provided with a graphical user interface (GUI) that allows the user to navigate the textual transcript 208 to identify "audio triggers" of interest (e.g., spoken words phrases, sound effects, and other audible events in the audio content stream of the audio file 206). An audio file location corresponding to a select audio trigger is referred to herein as being an "audible occurrence of the audio trigger."

Using user-specified audio triggers and the transcript/audio timestamp data 212, the event-timing development tool 214 may allow the user to tie the execution of a specified event to a particular audio trigger without requiring the user to provide or have any knowledge of a target animation frame number or timestamp at which the event is to occur.

If, for example, the user would like to add an audio-triggered event following or coinciding with the word "one" in the verbal countdown "three ... two ... one" (as in the example of FIG. 1), the user may type the audio trigger of interest (e.g., "one") into a search bar. The development tool parses the textual transcript 208 to find and present instances of the word "one." These instances, as well as textual context surrounding each instance, may be textually provided to the user, such as in a list or other easily readable format.

To generate each audio-based event association (discussed below), the event-timing development tool 214 may collect user inputs including (1) a particular target instance of the audio trigger; and (2) information identifying an event (the "audio-triggered event") that is to be executed concurrent with or responsive to an audible occurrence of the target instance of the audio trigger within the audio file 206.

Using the above-described inputs, the event-timing development tool 214 generates audio-event association metadata 218 associating the timestamp of the target instance of the user-specified audio trigger with the user-specified event name. This process may be repeated to add each of multiple events to the scene. By example and without limitation, the audio-event association metadata 218 may be a file associated with a singular scene and/or a singular audio file for a scene (e.g., scene1.wav). The audio-event association metadata 218 may include a list of event names and corresponding timestamps identifying locations within the audio file at which those events are to be executed by the application engine 202. This audio-event association metadata 218 is read by the application engine 202 while the corresponding scene is subsequently being presented to an end user such that the events named in the metadata file are executed at the time of their corresponding timestamps relative to the time at which the application engine 202 begins playing the audio file 206, as generally described above with respect to FIG. 1.

In some implementations, the event-timing development tool 214 may not receive the application development framework 216 as an input. For example, the event-timing development tool 214 may read in a common data file that defines a set or enumerated type (enum) of events that may be designated for association with audio timestamps and/or the event-timing development tool 214 may allow a user to define new events in the form of string names. In either case, the event-timing development tool 214 may output a data file including a list of event names and audio-file timestamps (as generally described above) that may be interpreted by a runtime script to fire (e.g., as "soft" events) at runtime.

Notably, the above-described usage of the audio-event association metadata 218 to trigger events may cause the timing of such events to be completely decoupled from the timing of animations. If, for example, the playback of the audio file 206 were to be moved in content by a designer, or procedurally moved at runtime, the associated audio-triggered events may be automatically moved in time along with the start of the playback such that the audio-triggered events continue to align with the audio.

Figure 3:
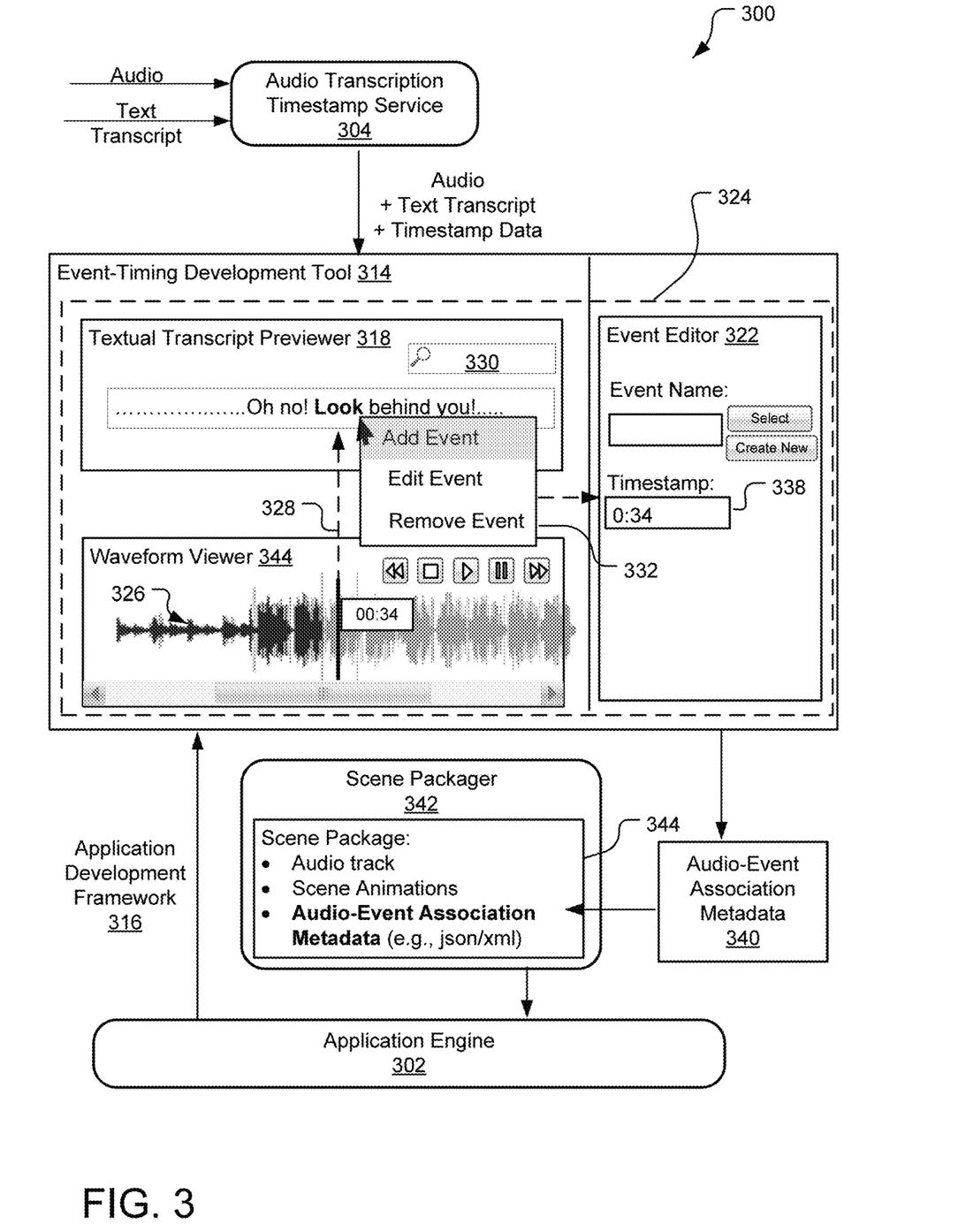
FIG. 3 aspects of another example system that uses an event-timing development tool to create audio-based event associations that drive timing of certain select events executed as part of a dynamic user-influenced media experience.

FIG. 3 illustrates aspects of another example system 300 that uses an event-timing development tool 314 to create audio-based event associations usable by an application engine 302 to drive timing of certain select events executed as part of a dynamic user-influenced media experience. The system 300 includes an audio transcription timestamp service 304 that receives as input an audio file and a text transcript of the audio file. The audio transcription timestamp service 304 outputs these same two inputs in addition to timestamp data, which may be understood as being the same or similar to the "transcript/audio timestamp data 212" described with respect to FIG. 2. In one implementation, this timestamp data includes a start and/or stop time for each word in the textual transcript. In some implementations, the timestamp data further includes timestamps indicating start and/or stop times for non-verbal content in the audio content stream of the audio file, such as timestamps corresponding to pauses, music, sound effects, etc.

The audio file, textual transcript, and timestamp data are all provided as inputs to an event-timing development tool 314. The event-timing development tool 314 includes an information datastore (not shown) that is populated with an application development framework 316 of an application engine 302. For example, the application development framework 316 defines various events, objects, structures, attributes, etc. that are accessible to the application engine 302 while presenting the dynamic user-influenced media experience (e.g., game or simulation) to a user.

The event-timing development tool 314 provides a GUI 324 (e.g., GUI including a textual transcript previewer 318, a waveform viewer 320, and an event editor 322) that allow a user to easily create associations between individual events defined within the application development framework 316 and audible occurrences of select trigger words or phrases audible within the audio content stream defined by the audio file. The elements of the GUI 324 may, in different implementations, vary in content and/or functionality so as to provide some functionality in addition to or in lieu of that described herein.

In FIG. 3, the GUI 324 of the event-timing development tool 314 includes a waveform viewer 344 that allows the user to view the waveform 326 of the input audio file, navigate to different locations along the waveform 326, and play the audio associated with such locations. For example, the user may be able to supply mouse or keyboard input to select a particular location in the waveform and to play audio at the location.

The textual transcript previewer 318 provides the user with a "preview" of select portions of the text textual transcript for the audio file. In the illustrated implementation, the textual transcript previewer 318 presents the text that is spoken at the location of the waveform read pointer 328 in the waveform viewer 344.

For example, a waveform read pointer 328 in the waveform viewer 344 indicates a currently selected position with a timestamp of "00:34" seconds relative to the start of the audio file. Using the loaded timestamp data, the event-timing development tool 314 identifies a corresponding position within the textual transcript and presents this text to the user. If the user is, for example, playing the audio file in the waveform viewer 344, the text shown in the textual transcript previewer 318 may continuously update such that the presented text is synchronized with speech spoken in the audio file. For example, the textual transcript previewer 318 may highlight the word ("look") at the precise time that this word is spoken and while the waveform read pointer 328 indicates the timestamp at which the word "look" is spoken. By example and without limitation, the textual transcript previewer may also present surrounding text from the transcript that is spoken before and after the position of the waveform read pointer 328.

As discussed above, the illustrated implementation may allow a user to selectively scroll through and select locations within the waveform 326 while also being presented with the corresponding text in the textual transcript. In some implementations, the textual transcript previewer 318 includes a search tool 330 that allows the user to type words or phrases from the textual transcript to navigate to a corresponding location within the waveform 326. For example, the user may type "oh no!" or "look" in the search tool 330 to move the waveform read pointer 328 to the illustrated position and to display the corresponding portion of the textual transcript within the textual transcript previewer 318.

In addition to the above-described elements, the GUI 324 further provides menu functionality that allows the user to link and/or edit an event that is defined within the application development framework 316 to a specific audible occurrence of a user-designated audio trigger. If, for example, the user wants to add a sub-animation that triggers when the word "look" is spoken, the user may select this word within the textual transcript previewer 318 (e.g., by right-clicking or otherwise) and, in response, be presented with one or more event-association options such as "add event," "edit event," "remove event" etc., as shown by the exemplary menu 332. Further selection of one or more options from the exemplary menu 332 may launch an event editor 322 and/or populate a timestamp field 338 within the event editor 322 with the current timestamp of the waveform read pointer 328. The event editor 322 provides GUI functionality (e.g., menu options, buttons, text field inputs, etc.) that allows a user to designate a specific type of event that is defined within the application development framework 316. In some implementations, the event editor 322 may include functionality that allows a user to create a new type of event and to update the application development framework 316 to reflect such changes. Likewise, the event editor 322 may allow the user to remove or edit events (e.g., alter function input parameters) that are already linked to particular locations within the audio file.

In addition to the usage of words from the text transcript, some implementations may further facilitate the designation of select "audio tones" and occurrences of such tones as event triggers. For example, the user may use the event-timing development tool 314 to listen to a short audio clip, identify the point within the waveform 326 corresponding to a tone of interest, and associate an event with this point as described above with respect to speech triggers from the text transcript.

Metaphorically speaking, the event-timing development tool 314 permits a user to easily "hook" a defined event to a particular spoken word or phrase in the audio file without having to listen to any of audio file or to identify the timestamp interest at which the particular word or phrase is spoken. For instance, some implementations may not present the timestamp (e.g., 00:34) of the waveform read pointer 328 because the user does not need to have access to this timestamp in order to link an event to it.

The event-timing development tool 314 outputs audio-event association metadata 340 for each scene that is edited by the tool as described above. In general, a scene may be understood as including various temporally-related animations that are to be rendered by the application engine 302 in synchronization with the audio content stream that is represented by the waveform 326 and the audio file that is provided as input to the event-timing development tool 314.

The content of the audio-event association metadata 340 may vary in different implementations. In one implementation, the audio-event association metadata 340 is a file that is associated with a single scene in the dynamic user-influenced media experience. This file may, for example, include a list of named events defined within the application development framework 316 that are each paired to one or more timestamps (e.g., a start time, a stop time or both) in the audio file such that each timestamps correlates with the audible occurrence of a user-selected audio trigger from the textual transcript.

In some implementations, the audio-event association metadata 340 may define some events in association with audio file locations in which there is no speech (e.g., silence, a dramatic pause, a background noise). For example, the user may utilize the GUI 324 to identify and select these locations in the same or similar manner to that described above with respect to specific spoken words.

The audio-event association metadata 340 may take on different forms in different implementations including that of a text file (e.g., XML, JSON) or an executable. In some implementations, the event-timing development tool 314 may include a packing module, such as scene packager 342, shown separately in FIG. 3, that creates a composite file for the scene embedding the audio-event association metadata 340 into a format that also encompasses visual and audio data for the scene. In other implementations where the audio-event association metadata 340 is a text file or executable, the scene packager 342 may take action(s) to associate the audio-event association data 340 with a particular scene, such as by creating a scene package 344 that bundles the metadata with other scene data (e.g., the audio file and scene animations) or by naming or saving the audio-event association metadata 340 such that the application engine 302 recognizes it as a component that is to be read and processed during presentation of the associated scene.

When executing the scene defined by the scene package 344, the application engine 302 synchronizes a read pointer of the audio file with the timestamp date included in the audio-event association metadata 340 such that each audio-triggered event named in the metadata file is read and initiated at according to its associated timestamp relative to the in the audio file relative to the start of the audio file. Upon reaching the timestamp for each named event in the audio-event association metadata 340, the application engine 302 sends the name of the event to an event subsystem (not shown), which triggers execution of the event.

In one implementation, the application engine 302 is adapted to ensure that the events specified in the audio-event association metadata 340 are triggered/executed in synchronization with the designated timestamps within the audio content stream even if timing of the audio content stream is modified at runtime, such as by an event or user input that causes the audio context stream to playback faster or slower, played as fragments into multiple separate segments, etc. In these cases, the application engine 302 may receive an instruction (e.g., within the audio-event association metadata 340 or otherwise) to mathematically translate the event timestamps within the audio-event association metadata 340 such that the specified events still correctly correlate with the modified audio data.

Figure 4:
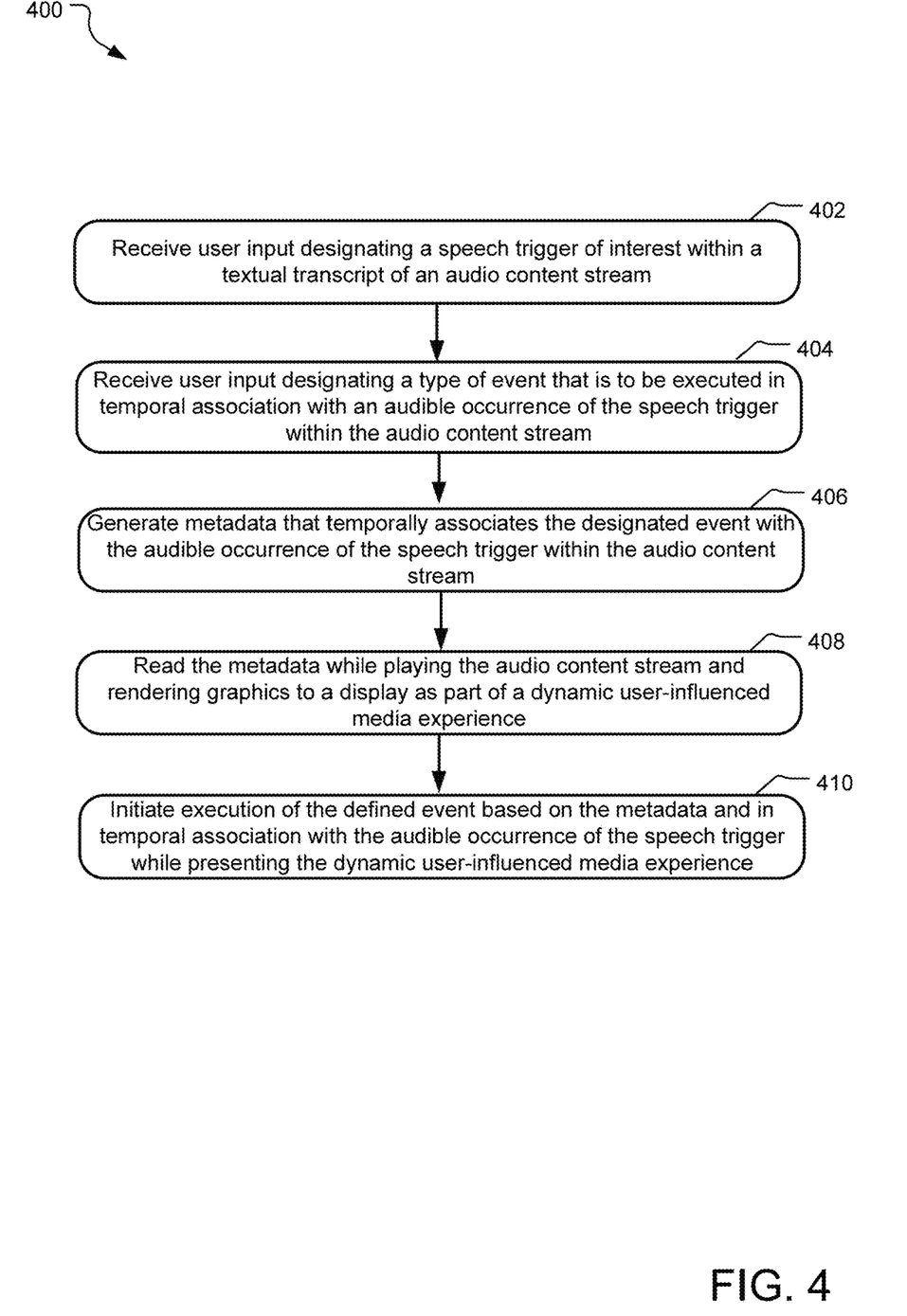
FIG. 4 illustrates example operations for utilizing a development tool to create audio-based event associations to drive timing of certain select events executed as part of a dynamic user-influenced media experience

FIG. 4 illustrates example operations 400 for utilizing a development tool to create audio-based event associations to drive timing of certain select events executed as part of a dynamic user-influenced media experience. A first receiving operation 402 receives user input designating an audio trigger of interest within a textual transcript of an audio content stream that is to be played during generation and presentation of a dynamic user-influence media experience. Another receiving operation 404 receives user input designating a type of event that is to be executed in temporal association with an audible occurrence of the audio trigger within the audio content stream. For example, the user may select a predefined event name from a list of events known to the event generation subsystem of an application engine.

Alternatively, the user may create and define a new event or event type. The event is, for example, a body of code executable to render a sub-animation, update a game state, provide haptic feedback, etc.

A metadata generation operation 406 generates metadata that temporally associates the designated event with the audible occurrence of the user-designated audio trigger within the audio content stream. For example, the metadata generation operation 406 may entail determining a timestamp identifying a location of the audible occurrence of the audio trigger within the audio content stream and then storing a name of the defined event in association with that timestamp as well as in association with information usable to identify the file (or collection of files) that containing the data of the audio content stream.

A reading operation 408 reads the generated metadata while playing the audio content stream and rendering graphics to a user display as part of a dynamic user-influenced media experience. For example, the reading operation 408 may be performed by an application engine rendering an animation and dynamically updating the animation in response to user input while playing an associated audio content stream. According to one implementation, the application engine synchronizes a read pointer for the metadata file with playing of the audio content stream such that the read pointer timestamps within the metadata file indicate an exact offset relative to a start (or defined point) within the audio content stream.

An event initiation operation 410 initiates execution of the defined event based on the metadata and in temporal association with the audible occurrence of the audio trigger while presenting the dynamic user influenced media experience. For example, "temporal association" may mean that the defined event is executed at the exact time of the audible occurrence of the audio trigger or at a predetermined, definitive offset relative to such time. For example, the metadata may specify that a certain event is to occur exactly when a particular word is spoken in the audio script or 10 ms after the particular word is spoken. In scenarios where the event is triggered at some offset relative to a user-specified audio trigger, the offset may be used as an input in creating the metadata.

Figure 5:
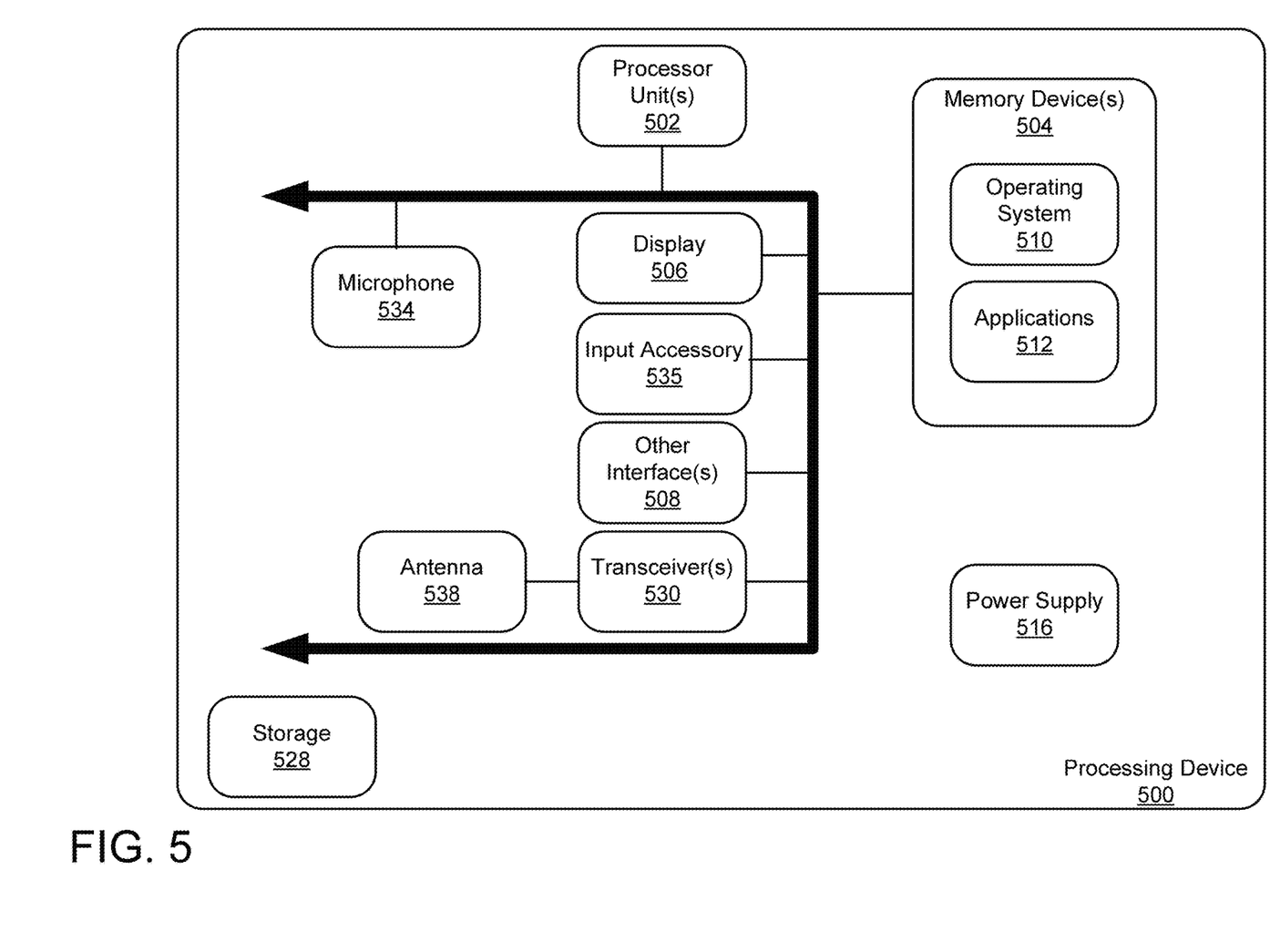
FIG. 5 illustrates an example schematic of a processing device suitable for implementing aspects of the disclosed technology.

FIG. 5 illustrates an example schematic of a processing device 500 suitable for implementing aspects of the disclosed technology. The processing devices 500 includes one or more processor unit(s) 502, memory device(s) 504, a display 506, and other interfaces 508 (e.g., buttons). The processor unit(s) 502 may each include one or more CPUs, GPUs, etc.

The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, may resides in the memory 504 and be executed by the processor unit(s) 502, although it should be understood that other operating systems may be employed.

One or more applications 512 are loaded in the memory 504 and executed on the operating system 510 by the processor unit(s) 502. Applications 512, such as an AI power controller, may receive inputs from one another as well as from various input local devices such as a microphone 534, input accessory 535 (e.g., keypad, mouse, stylus, touchpad, gamepad, racing wheel, joystick), and a camera 532. Additionally, the applications 512 may receive input from one or more remote devices, such as remotely-located smart devices, by communicating with such devices over a wired or wireless network using more communication transceivers 530 and an antenna 538 to provide network connectivity (e.g., a mobile phone network, Wi-Fi®, Bluetooth®). The processing device 500 may also include one or more storage devices 528 (e.g., non-volatile storage). Other configurations may also be employed.

The processing device 500 further includes a power supply 516, which is powered by one or more batteries or other power sources and which provides power to other components of the processing device 500. The power supply 516 may also be connected to an external power source (not shown) that overrides or recharges the built-in batteries or other power sources.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes an application engine stored in memory that is executable to generate a dynamic user-influenced media experience and a development tool for adding electronically-driven effects to the dynamic user-influenced media experience. The development tool is stored in the memory and executable to receive first user input and second user input. The first user input defines an audio trigger corresponding to one or more words or phrases appearing in a textual transcript of an audio content stream to be presented as part of the dynamic user-influenced media experience, while the second user input defines an event to be executed by the application engine in temporal association with an audible occurrence of the audio trigger during the dynamic user-influenced media experience. The development tool outputs metadata associating the defined event with the audio trigger, and the application engine is adapted to interpret the metadata as an instruction to selectively trigger execution of the defined event in temporal association with the audible occurrence of the audio trigger while presenting the dynamic user-influenced media experience.

In another example system according to any preceding system, the user input defines a select location within the textual transcript.

In still another example system according to any preceding system, the development tool is further adapted to define a timestamp location within the audio content stream that temporally correlates with the audible occurrence of the audio trigger.

In yet still another example system of any preceding system, the metadata associates the defined timestamp with a defined event name identifying the event.

In another example system of any preceding system the application engine is further configured to read the metadata while playing the audio content stream and rendering graphics to a display as part of the dynamic user-influenced media experience and to initiate the event according to a timestamp specified by the metadata relative to a start of the audio content stream.

In another system of any preceding system, the application engine is a game engine.

In yet still another example system of any preceding system, execution of the defined event launches a sub-animation.

In another example system of any preceding system, execution of the defined event provides tactile sensory feedback to a user controller.

In yet another example system of any preceding system, execution of the defined event launches one or more ancillary events that differ in execution based on user-provided inputs within the dynamic user-influenced media experience.

Another example system of any preceding system further includes a web-based service adapted to analyze the audio content stream and the textual transcript; and based on the analysis, output timestamp data indicating a time at which each word of the textual transcript is spoken within the audio content stream. The development tool accepts the output timestamp data as an input.

An example method disclosed herein facilitates the addition of electronically-driven effects to a dynamic user-influenced media experience. The method comprises receiving first and second input. The input is an audio trigger corresponding to one or more words or phrases within a textual transcript of an audio content stream to be presented as part of the dynamic user-influenced media experience, and the second input selects a defined event that is to be executed in temporal association with an audible occurrence of the audio trigger during the dynamic user-influenced media experience. The method further provides for generating metadata temporally associating the defined event with the audible occurrence of the audio trigger and for interpreting the generated metadata as an instruction to selectively trigger execution of the defined event in temporal association with the audible occurrence of the audio trigger while presenting the dynamic user-influenced media experience.

In an example method according to any preceding method, generating the metadata further comprises storing a name of the defined event with a timestamp identifying a location of the audible occurrence of the audio trigger in the audio content stream.

In yet still another example method according to any preceding method, interpreting the generated metadata further comprises reading the metadata while playing the audio content stream and rendering graphics to a display as part of the dynamic user-influenced media experience and initiating execution of the defined event according to the timestamp specified by the metadata relative to a start of the audio content stream.

In still another example method of any preceding method, a game engine generates the dynamic user-influenced media experience and interprets the generated metadata.

In another example method of any preceding method, initiating the defined event according to the timestamp further comprises launching a sub-animation within the dynamic user-influenced media experience according to the timestamp.

In yet still another example method of any preceding method, initiating the defined event according to the timestamp further comprises providing tactile sensory feedback to a user controller within the dynamic user-influenced media experience according to the timestamp.

An example tangible storage media disclosed herein encodes computer-executable instructions for executing a computer process that adds electronically-driven effects to a dynamic user-influenced media experience. The computing process comprises receiving first and second inputs. The first input designates an audio trigger that defines a select location within an audio content stream. The second input identifies a defined event that is to be executed when a playback pointer reaches the select location within the audio content stream during the dynamic user-influenced media experience. The computer process further provides for generating metadata temporally associating the defined event with the audio trigger and for interpreting the generated metadata as an instruction to selectively trigger execution of the defined event at a time that the playback pointer reaches the select location within the audio content stream while presenting the dynamic user-influenced media experience.

In an example computing process of any preceding computer process encoded on a tangible storage media, the computer process further comprises generating the metadata by storing a name of the defined event with a timestamp identifying the select location in the audio content stream.

In an example computing process of any preceding computer process encoded on a tangible storage media, the computer process further comprises reading the metadata while playing the audio content stream and rendering graphics to a display as part of the dynamic user-influenced media experience and initiating the defined event according to the timestamp specified by the metadata relative to a start of the audio content stream.

In still an example computing process of any preceding computer process encoded on a tangible storage media, the computer process further comprises reading the metadata and initiating the defined event is performed by a game engine.

Another example system disclosed herein provides for adding electronically-driven effects to a dynamic user-influenced media experience. The system provides a means for receiving first and second inputs. The first input designates an audio trigger that defines a select location within an audio content stream. The second input identifies a defined event that is to be executed when a playback pointer reaches the select location within the audio content stream during the dynamic user-influenced media experience. The system further includes a means for generating metadata temporally associating the defined event with the audio trigger and a means for interpreting the generated metadata as an instruction to selectively trigger execution of the defined event at a time that the playback pointer reaches the select location within the audio content stream while presenting the dynamic user-influenced media experience.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:
   one or more processors;
   an application engine stored in memory and executable to generate a dynamic user-influenced media experience; and
   a development tool for adding electronically-driven effects to the dynamic user-influenced media experience, the development tool being stored in the memory and executable by the one or more processors to:
   receive first developer input defining an audio trigger corresponding to one or more words or phrases appearing in a textual transcript of an audio content stream to be presented as part of the dynamic user-influenced media experience;
   receive second developer input further defining an event to be executed by the application engine in temporal association with an audible occurrence of the audio trigger during the dynamic user-influenced media experience, wherein execution of the event is dependent upon first user input provided by an end user during execution of the dynamic user-influenced media experience; and
output a metadata file including at least one timestamp defined relative to a start of the audio content stream, the at least one timestamp being associated in the metadata file with the defined event, the application engine being adapted to:
synchronize a read pointer for the metadata file with a playback pointer for the audio content stream;
modify timing of the audio content stream responsive to second user input received during the dynamic user-influenced media experience; and
based on the modified timing and the synchronization of the read pointer with the playback pointer, execute the defined event when the playback pointer for the audio content stream reaches a position originally associated with the timestamp while concurrently presenting the dynamic user-influenced media experience.

2. The system of claim 1, wherein the first developer input defines a select location within the textual transcript.

3. The system of claim 2, wherein the development tool is further adapted to define a timestamp location within the audio content stream that temporally correlates with the audible occurrence of the audio trigger.

4. The system of claim 3, wherein the metadata associates the defined timestamp location with a defined event name identifying the event.

5. The system of claim 1, wherein the application engine is further configured to:
read the metadata while playing the audio content stream and rendering graphics to a display within the dynamic user-influenced media experience; and
initiate the event according to a timestamp specified by the metadata relative to a start of the audio content stream.

6. The system of claim 1, wherein the application engine is a game engine.

7. The system of claim 1, wherein the execution of the defined event launches a sub-animation.

8. The system of claim 1, wherein the execution of the defined event provides tactile sensory feedback to a user controller.

9. The system of claim 1, wherein the execution of the defined event launches one or more ancillary events that differ based on the first user input within the dynamic user-influenced media experience.

10. The system of claim 1, further comprising:
a web-based service adapted to:
analyze the audio content stream and the textual transcript; and
based on the analysis, output timestamp data indicating a time at which each word of the textual transcript is spoken within the audio content stream, wherein the development tool accepts the output timestamp data as a third developer input.

11. A method for adding electronically-driven effects to a dynamic user-influenced media experience, the method comprising:
receiving as a first developer input an audio trigger corresponding to one or more words or phrases within a textual transcript of an audio content stream to be presented as part of the dynamic user-influenced media experience;
receiving as a second developer input a selection of a defined event that is to be executed in temporal association with an audible occurrence of the audio trigger during the dynamic user-influenced media experience;
generating a metadata file including metadata temporally associating the defined event with a timestamp of the audible occurrence of the audio trigger within the audio content stream, wherein execution of the defined event is dependent first user upon input provided by an end user during execution of the dynamic user-influenced media experience;
synchronizing a read pointer for the metadata file with a playback pointer for the audio content stream;
modifying timing of the audio content stream responsive to second user input received during the dynamic user-influenced media experience; and
as a result of the modified timing, the synchronization of the read pointer with the playback pointer, and the playback pointer for the audio content stream reaching a position originally associated with the timestamp in the audio content stream, executing the defined event during the dynamic user-influenced media experience.

12. The method of claim 11, wherein generating the metadata further comprises:
storing a name of the defined event with a timestamp identifying a location of the audible occurrence of the audio trigger in the audio content stream.

13. The method of claim 12, wherein interpreting the generated metadata further comprises:
reading the metadata while playing the audio content stream and rendering graphics to a display within the dynamic user-influenced media experience; and
initiating the execution of the defined event according to the timestamp specified by the metadata relative to a start of the audio content stream.

14. The method of claim 11, wherein a game engine generates the dynamic user-influenced media experience and interprets the generated metadata.

15. The method of claim 13, wherein initiating the defined event according to the timestamp further comprises:
launching a sub-animation within the dynamic user-influenced media experience according to the timestamp.

16. The method of claim 13, wherein initiating the defined event according to the timestamp further comprises:
providing tactile sensory feedback to a user controller within the dynamic user-influenced media experience according to the timestamp.

17. One or more tangible computer-readable storage media devices encoding computer-executable instructions for executing a computer process that adds electronically-driven effects to a dynamic user-influenced media experience, the computing process comprising:
receiving a first developer input designating an audio trigger associated with a select location within an audio content stream;
receiving a second developer input defining an event that is to be executed when a playback pointer reaches the select location within the audio content stream during the dynamic user-influenced media experience;
generating a metadata file including metadata temporally associating the defined event with the select location within the audio content stream, wherein execution of the defined event is dependent upon first user input provided by an end user during execution of the dynamic user-influenced media experience;
synchronizing a read pointer for the metadata file with a playback pointer for the audio content stream;

modifying timing of the audio content stream responsive to second user input received during the dynamic user-influenced media experience; and as a result of the modified timing, the synchronization of the read pointer with the playback pointer, and the playback pointer for the audio content stream reaching a position originally associated with the timestamp in the audio content stream, executing the defined event during the dynamic user-influenced media experience.

18. The one or more tangible computer-readable storage media devices of claim 17, wherein the computing process further comprises:

generating the metadata by storing a name of the defined event with a timestamp identifying the select location in the audio content stream.

19. The one or more tangible computer-readable storage media devices of claim 18, wherein the computing process further comprises:

reading the metadata while playing the audio content stream and rendering graphics to a display as part of the dynamic user-influenced media experience; and initiating the defined event according to the timestamp specified by the metadata relative to a start of the audio content stream.

20. The one or more tangible computer-readable storage media devices of claim 19, wherein reading the metadata and initiating the defined event is performed by a game engine.

* * * * *